(12) United States Patent
Schultz et al.

(10) Patent No.: US 7,791,671 B2
(45) Date of Patent: Sep. 7, 2010

(54) SMART CAMERA WITH MODULAR EXPANSION CAPABILITY INCLUDING A FUNCTION MODULE THAT PERFORMS IMAGE PROCESSING

(75) Inventors: Kevin L. Schultz, Georgetown, TX (US); Perry Steger, Georgetown, TX (US); Stefanie Breyer, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 12/426,268

(22) Filed: Apr. 19, 2009

(65) Prior Publication Data

US 2009/0201379 A1     Aug. 13, 2009

Related U.S. Application Data

(60) Division of application No. 11/857,041, filed on Sep. 18, 2007, now Pat. No. 7,532,249, which is a continuation of application No. 10/120,151, filed on Apr. 10, 2002, now Pat. No. 7,327,396.

(51) Int. Cl.
*H04N 7/18* (2006.01)
*H04N 5/232* (2006.01)
*H04N 5/225* (2006.01)

(52) U.S. Cl. .................... 348/375; 348/86; 348/211.4; 348/211.6; 348/373

(58) Field of Classification Search ............ 348/207.99, 348/207.1, 207.11, 211.99–211.4, 211.14, 348/372–376, 86, 91, 92, 94, 95
See application file for complete search history.

(56) References Cited

U.S. PATENT DOCUMENTS 5,309,556 A     5/1994    Sismilich (Continued)

FOREIGN PATENT DOCUMENTS

WO     99/09498     2/1999

OTHER PUBLICATIONS

In-Sight Hardware Specifications, Cognex Corporation, 5 pages, 2001.

(Continued)

*Primary Examiner*—Sinh Tran
*Assistant Examiner*—Daniel M Pasiewicz
(74) *Attorney, Agent, or Firm*—Meyertons Hood Kivlin Kowert & Goetzel, P.C.; Jeffrey C. Hood; Joel L. Stevens

(57) ABSTRACT

A smart camera with modular expansion capabilities, including a housing, a camera directly attached to the housing for acquiring an image of an object, a functional unit comprised in the housing and coupled to the camera, where the functional unit is configurable to implement an image processing function, a backplane comprised in the housing and coupled to the functional unit to provide electrical communication, and one or more slots comprised in the housing, where each slot includes a connector that is electrically coupled to the backplane, and where each slot is adapted for receiving a function module. An inserted function module provides modular functionality to the smart camera, such as dedicated image processing functionality, pattern recognition, analysis, communication, sensor, sensor I/O, signal conditioning and/or conversion, control, measurement, and synchronization, among others. The function module may communicate a protocol to the functional unit which may be configured to implement the protocol.

20 Claims, 8 Drawing Sheets

U.S. PATENT DOCUMENTS

| | | | |
|---|---|---|---|
| 5,497,498 | A | 3/1996 | Taylor |
| 5,535,342 | A | 7/1996 | Taylor |
| 5,541,849 | A | 7/1996 | Rostoker et al. |
| 5,583,749 | A | 12/1996 | Tredennick et al. |
| 5,603,043 | A | 2/1997 | Taylor et al. |
| 5,631,974 | A | 5/1997 | Lau-Kee et al. |
| 5,638,299 | A | 6/1997 | Miller |
| 5,652,875 | A | 7/1997 | Taylor |
| 5,684,980 | A | 11/1997 | Casselman |
| 5,732,277 | A | 3/1998 | Kodosky et al. |
| 5,737,235 | A | 4/1998 | Kean et al. |
| 5,742,504 | A | 4/1998 | Meyer et al. |
| 5,754,227 | A | 5/1998 | Fukoka |
| 5,844,606 | A | 12/1998 | Suemoto et al. |
| 5,847,953 | A | 12/1998 | Sojoodi et al. |
| 6,006,039 | A | 12/1999 | Steinberg et al. |
| 6,028,611 | A | 2/2000 | Anderson et al. |
| 6,064,409 | A | 5/2000 | Thomsen et al. |
| 6,157,394 | A | 12/2000 | Anderson et al. |
| 6,173,438 | B1 | 1/2001 | Kodosky et al. |
| 6,177,950 | B1 | 1/2001 | Robb |
| 6,219,628 | B1 | 4/2001 | Kodosky et al. |
| 6,272,245 | B1 * | 8/2001 | Lin ............................ 382/195 |
| 6,282,462 | B1 | 8/2001 | Hopkins |
| 6,298,474 | B1 | 10/2001 | Blowers et al. |
| 6,345,130 | B1 * | 2/2002 | Dahl .......................... 382/286 |
| 6,437,826 | B1 | 8/2002 | Arnold |
| 6,496,361 | B2 | 12/2002 | Kim et al. |
| 6,504,575 | B1 | 1/2003 | Ramirez et al. |
| 6,546,207 | B2 | 4/2003 | Wakui |
| 6,587,140 | B2 | 7/2003 | No |
| 6,597,346 | B1 | 7/2003 | Havey et al. |
| 6,628,198 | B2 | 9/2003 | Fieschi et al. |
| 6,657,654 | B2 | 12/2003 | Narayanaswami |
| 6,680,749 | B1 | 1/2004 | Anderson et al. |
| 6,795,651 | B2 | 9/2004 | Silverbrook |
| 6,832,920 | B2 | 12/2004 | Glad et al. |
| 6,842,652 | B2 | 1/2005 | Yeung |
| 6,873,367 | B1 | 3/2005 | Hirata et al. |
| 6,886,168 | B2 | 4/2005 | Callaway et al. |
| 6,888,566 | B2 | 5/2005 | Larkin et al. |
| 6,923,377 | B2 * | 8/2005 | Postman et al. ............. 235/487 |
| 6,930,709 | B1 | 8/2005 | Creamer et al. |
| 6,992,711 | B2 | 1/2006 | Kubo |
| 7,142,731 | B1 | 11/2006 | Toi |
| 7,327,396 | B2 | 2/2008 | Schultz et al. |
| 7,453,492 | B2 | 11/2008 | Silverbrook |
| 2002/0071051 | A1 | 6/2002 | Ikeda |
| 2002/0140824 | A1 | 10/2002 | Christoff et al. |
| 2002/0186302 | A1 | 12/2002 | Pulkinnen |

OTHER PUBLICATIONS

Matrox 4 Sight-II Information Sheets, 6 pages, Sep. 22, 2000.

Braggins, Donald W., "Computer Vision for Industry", SPIE Proceedings, vol. 1989, pp. 88-102.

Gertz, et al., "A Software Architecture-Based Human-Machine Interface for Reconfigurable Sensor-Based Control System", proceedings, 8th IEEE International Symposium on Intelligent Control, Aug. 25-26, 1993, Chicago, Illinois.

Lindblad, et al., "The VuSystem: A Programming System for Compute-Intensive Multimedia", IEEE Journal of Selected Areas in Communications, 1996.

Olson, et al., "Mavis: A Visual Environment for Active Computer Vision", 1992.

Xiao-Yu, et al., "Sotware Environment for WASMII: A Data Driven Machine with a Virtual Hardware," Field Programmable Logic Architectures, Synthesis and Applications, 4th International Workshop on Field-Programmable Logic and Applications, FPL '94 Proceedings, Berlin, Germany, 1994.

Edwards, et al., "Software acceleration using programmable hardware devices," IEEE Proceedings: Computers and Digital Techniques, vol. 143, No. 1, Jan. 1996, pp. 55-63.

Leeser, et al, "High Level Synthesis and Generating FPGAs with the BEDROC System," Journal of VLSI Signal Processing, vol. 6, No. 2, Aug. 1993, pp. 191-214.

Ade, M; Lauwereins, R; Peperstraete, J.A.; Hardware-Software Codesign with GRAPE, Proceedings of the Sixth IEEE International Workshop on Rapid System Prototyping, pp. 40-47, Jun. 9, 1995.

Lauwereins, R; Engels, M; Ade, M; Peperstraette, J; Grape-II: A System-Level Prototyping Environment for DSP Applications, Computer, vol. 28, Issue 2, pp. 35-43, Feb. 1995.

Lysaght, P; Stockwood, J; A Simulation Tool for Dynamically Reconfigurable Field Programmable Gate Arrays, IEEE Transactions on Very Large Scale Integration Systems, vol. 4, Issue 3, pp. 381-390, Aug. 1996.

De Coster, GRAPE-II: An Introduction [online]. Automatic Control and Computer Architectures Department. Katholieke Universiteit Leuven, Belgium, Feb. 22, 1996 [retrieved Oct. 6, 1999] Retrieved from the Internet @http://www.esat.kuleuven.ac.be/acca.

Weban et al., A Software Development System for FPGA-based Data Acquisition Systems, Proceedings of the IEEE Symposium on FPGAs for Custom Computing Machines, pp. 28-37, Apr. 1996.

Petronino et al., An FPGA-based Data Acquisition System for a 95 GHz. W-band Radar, IEEE International Conference on Acoustics, Soeech and Signal Processing, vol. 5, pp. 4105-4108, Apr. 1997.

Boulay et al., A High Throughput Controller for a 256-Channel Cardiac Potential Overlapping System, Canadian Conference on Electrical and Computer Engineering, vol. 1, pp. 539-542, Sep. 1995.

Collamati et al. "Induction Machine stator Fault On-line Diagnosis Based on LabVIEW Environment", Mediterranean Electrotechnical Conference, vol. 1, p. 495-498, May 1996.

Spoelder et al., "Virtual Instrumentation: A Survey of Standards and Their Interrelation", Proc. IEEE Instr. and Measurement Tech. Conf., vol. 1, pp. 676-681, May 1997.

Srinivasan et al., "LabVIEW program Design for On-Line Data Acquisition and Predictive Maintenance", Proc. Of the 30th Southeastern Symp. On System Theory, pp. 520-524, Mar. 1998.

Wahidanabanu et al., "Virtual Instrumentation with Graphical Programming for Enhanced Detection and Monitoring of Partial Discharges", Proc. Electrical Insulation Conf. 1997, pp. 291-296, Sep. 1997.

Smart Camera Based on FPGA Technology, 11 pages, printed from Internet Website www.gel.ulaval.ca/vision/vlsi/camera on Dec. 28, 2001.

IMAQ Vision Builder Tutorial, National Instruments Corporation, Jan. 1999 Edition.

IMAQ Vision for G Reference Manual, National Instruments Corporation, Jun. 1999 Edition.

* cited by examiner

SMART CAMERA WITH MODULAR EXPANSION CAPABILITY INCLUDING A FUNCTION MODULE THAT PERFORMS IMAGE PROCESSING

PRIORITY INFORMATION

This application is a divisional of U.S. patent application Ser. No. 11/857,041 titled "Smart Camera with a Plurality of Slots for Modular Expansion Capability Through a Variety of Function Modules Connected to the Smart Camera" filed Sep. 18, 2007, now U.S. Pat. No. 7,532,249 whose inventors are Kevin L. Schultz, Perry Steger and Stefanie Breyer, which is a continuation of application Ser. No. 10/120,151, filed Apr. 10, 2002, whose title is "Smart Camera with a Plurality of Slots for Modular Expansion Capability Through a Variety of Function Modules Connected to the Smart Camera", whose inventors are Kevin L. Shultz, Perry Steger, and Stefanie Breyer, now U.S. Pat. No. 7,327,396, and which are all hereby incorporated by reference in their entirety as though fully and completely set forth herein.

FIELD OF THE INVENTION

The present invention relates to the field of machine vision applications, and more particularly to a smart camera with modular expansion capabilities.

DESCRIPTION OF THE RELATED ART

In many applications, machine vision or image processing analysis is used to inspect or locate an object. For example, in manufacturing applications, machine vision analysis may be used to detect defects in a manufactured object by acquiring images of the object and using various types of image processing algorithms to analyze the images. As an example, a system to manufacture electrical components such as capacitors may use machine vision to examine respective sides of the capacitors in order to detect manufacturing defects, ensure that the capacitors are labeled, marked, or color coded properly, etc.

Machine vision applications may use image processing software operable to perform any of various types of image analysis or image processing functions or algorithms in examining an acquired image of an object. For example, pattern matching algorithms are often used, e.g., in order to compare the pattern information of the acquired image to pattern information of a template image. Color matching algorithms may also be used, e.g., in order to compare the color information of the acquired image to the color information of a template image. Blob (Binary Large Object) analysis tools may also be used to examine an image. In various applications, pattern, color and/or Blob analysis information may be used to verify that: an object includes all necessary components in the correct locations, an object has the appropriate words, labels, or markings, an object surface is not scratched or otherwise defective, etc.

Any of type of camera or other device may be used to acquire the images to be analyzed in a machine vision application, including digital cameras, line scan cameras, etc. As used herein, the term "camera" is intended to encompass all such devices, including infrared imaging devices, x-ray imaging devices, ultra-sonic imaging devices, and any other type of device which operates to receive, generate, process, or acquire an image or sensor data.

Typically, the image processing and analysis of image data is performed by a computing system which may be coupled to the camera. For example, a personal computer (PC) may receive image data from a camera and may execute one or more software programs to process and analyze the image data. As another example, a data acquisition (DAQ) computer board (e.g., installed in a computer) may receive image data from the camera and perform various signal processing operations on the data, including pattern recognition, signal conditioning and conversion, and filtering, among others.

Increasingly, however, such image processing capabilities are performed by the camera or sensor by hardware and/or software "on-board" the device. The term "smart camera" is intended to include any of various types of devices that include a camera or other image sensor and a functional unit (i.e., a processor/memory and/or programmable hardware, such as a field programmable gate array (FPGA)) capable of being configured to perform an image processing function to analyze or process an acquired image. Examples of smart cameras include: NAVSYS Corporation's GI-EYE, which generates digital image data that are automatically tagged with geo-registration meta-data to indicate the precise position and attitude of the camera when the image was taken; Vision Components' GmbH Smart Machine Vision Cameras, which integrate a high-resolution Charge Coupled Device (CCD) sensor with a fast image-processing signal processor, and provide various interfaces to allow communication with the outside world; and Visual Inspection Systems' SMART cameras with on-board DSP capabilities, including frame grabbers and robot guidance systems, among others.

However, in general, smart cameras are specialized devices whose image acquisition/processing capabilities are substantially fixed. In other words, the flexibility and expandability of the image processing and analysis functions are quite limited. Thus, there is a need for a smart camera with modular expansion capabilities.

SUMMARY OF THE INVENTION

One embodiment of the present invention comprises a smart camera with one or more expansion slots, e.g., a plurality of expansion slots, each of which is operable to receive a function module. One or more function modules may be inserted into respective slots of the smart camera to configure the smart camera to perform a desired function. Thus, the smart camera may also include one or more function modules which provide various additional functions for the smart camera, as described below.

As used herein, the term "smart camera" is intended to include any of various types of devices that are operable to acquire and/or store an image and which include a functional unit or other on-board processing capabilities. Examples of a smart camera include analog and digital cameras with on-board processors, and other similar types of devices. The smart camera may include a functional unit for performing a function, such as an image processing function, as described below, and thus may be further operable to analyze or process the acquired or stored image.

The smart camera may be operable to couple to a host computer system via a serial bus, a network, or through other means. The host computer may comprise a CPU, a display screen, memory, and one or more input devices such as a mouse or keyboard as shown. The computer may operate with the smart camera to analyze, measure or control a device or process. Alternatively, the computer, or a computer system, may be used only to configure the functional unit in the smart camera or one or more of the function modules. In other embodiments, the computer may be omitted, i.e., the smart camera may operate completely independent of the computer.

The smart camera may include a digital camera that acquires a digital video signal which comprises an image, or a sequence of images, or other data desired to be acquired. In one embodiment, the smart camera may instead include an analog camera that acquires an analog video signal, and the smart camera may further include an A/D converter for converting the analog video signal into a digital image. The smart camera may also be operable to provide signal conditioning on signals from the analog camera.

In some embodiments, the functional unit of the smart camera may comprise a processor and memory medium, wherein the memory medium stores computer programs, e.g., text based or graphical programs for execution by the processor. In other embodiments, the functional unit may be a programmable hardware element, and configuration information may be stored which may be used to configure the programmable hardware element, such as a field programmable gate array (FPGA), to perform a desired function, such as an image processing, measurement, control, or analysis function, among others.

The functional unit comprised in the smart camera may be configured according to a program, e.g., a text-based or graphical program. For example, the functional unit may be configured to perform an image processing function as represented by a graphical program. The functional unit and/or the function module(s) in the smart camera may perform all of the desired image processing function, including optionally performing an operation based on determined characteristics of the image, and hence the computer system may not be necessary during operation of the system.

In one embodiment, the smart camera (and optionally, the computer), may be comprised in an image acquisition/processing system which may be used in manufacturing assembly, test, measurement, and/or control applications, among others. The system may also include a motion control device which may operate in response to signals received from the smart camera or from the computer. The functional unit in the smart camera (or the function module, or the computer system) may control the motion control device. Examples of motion control functions include moving a part or object to be imaged by a camera, rejecting a part on an assembly line, or placing or affixing components on a part being assembled, or a robotics application, among others.

As noted above, function modules may be inserted into slots of the smart camera to configure the smart camera for desired operations. In one embodiment, the smart camera together with the function module may operate as a measurement or control device. For example, in one embodiment, the function module may be operable to couple to a sensor, where the sensor is operable to send sensor signals to the function module for one or more of signal conditioning and signal conversion. The signal conditioning may include one or more of protection, isolation, filtering, amplification, and excitation. The signal conversion may include one or more of analog to digital (A/D) conversion and digital to analog (D/A) conversion. Thus, the function module may be operable to perform signal conditioning and/or signal conversion on signals sent by a sensor coupled to the function module (not shown), and to transmit results of such processing on to the smart camera.

In another embodiment, the function module may include a sensor as well as the signal conditioning and/or conversion logic, and so the function module may be operable to perform one or more of signal conditioning and signal conversion on sensor signals received from the sensor comprised on the function module.

One or more of the function modules may include a functional unit, such as a processor and memory, or an FPGA. Thus, the function module may operate to provide co-processing functionality to the smart camera. For example, in one embodiment, the function module may perform an image processing function, such as pattern matching, blob analysis, edge detection, etc., on an acquired image. Thus, at least a portion of the computation load which might normally be handled by the functional unit of the smart camera may be off-loaded to the function module. Additionally, dedicated processing functions may be provided by the function module(s) which may exceed the capabilities of the smart camera functional unit.

In one embodiment, multiple function modules may be used in conjunction to perform image processing, measurement, and/or control tasks. For example, one function module may include a sensor, such as a thermocouple, pressure sensor, or strain gauge, while a second module may perform signal conditioning and/or conversion on signals received from the sensor function module. The smart camera may communicate with the function modules and perform an action, such as generating an image, based on signals received from the function modules. For example, a function module may receive signals from a temperature sensor and perform signal conditioning and/or signal conversion on the signals to generate a scaled temperature value. The temperature value may be transmitted to the functional unit on the smart camera which may compare the value to a threshold, and if the value exceeds the threshold, the smart camera may generate/capture an image. Furthermore, if one of the function modules includes a functional unit, the function module may perform an image processing function on the acquired image, as noted above.

In another embodiment, a function module may include a functional unit or control logic which may be operable to control an actuator, such as a stepping motor, to perform a motion task. The smart camera may analyze image information and communicate results to the function module, and thus may use the function module to perform a machine vision task. In other embodiments, function modules may perform such tasks as timing, alarms, logging, synchronization, etc. For example, when multiple smart cameras are used, the function modules may provide synchronization functions to the cameras, thereby facilitating coordinated operation of the cameras. In one embodiment, one of the smart cameras may operate as a master unit, while the other smart cameras operate as slaves, where the smart cameras' respective function modules each provide synchronization functionality as appropriate depending on the master/slave status of the respective camera unit. In another embodiment, each of the smart cameras may operate as peers, where the function modules coordinate the respective camera operations in a peer-to-peer manner.

In another embodiment, a plurality of smart cameras may be coupled to each other via a network, e.g., through wireless means, thereby implementing a distributed machine vision, where the communication and/or coordination functionality is provided at least in part by the cameras' respective function modules. For example, multiple cameras may each acquire an image of an object, then collectively analyze the different views of the object to generate three dimensional information about the object. Thus, the function module may comprise connectivity to one or more other smart cameras, providing for coordinated operations between the smart camera and the one or more other smart cameras.

In another embodiment, the function module may include a gyroscope which may stabilize the smart camera, allowing for precise control of the camera's orientation. In one embodiment, the function module may have a small form factor which may enable deployment of the smart camera with minimal space requirements.

Thus, in various embodiments, the function modules may provide expanded functionality for the smart camera, including one or more of telecommunication, integrated signal conditioning, optional isolation, support for plug and play sensors (IEEE 1451.4), image processing, control functionality, easy use and configuration, DSP (Digital Signal Processing), ASP (Analog Signal Processing), displays, GUI's, thermocouples, analog inputs, fast analog inputs allowing vibration analysis, analog output, digital input, digital output, analysis, decision-making, pattern recognition, web site access, publishing, and/or hosting, industrial control, LCD display, and/or printing functions for the smart camera, networking, auxiliary power, stabilization, and Global Positioning System (GPS) functions for precise positioning with a satellite system, among others.

In one embodiment, the smart camera may be operable to receive interface protocol information from the function module specifying how to operate or interface with the function module. The smart camera may then communicate the interface protocol information to the computer system and, based on the interface protocol information, the computer system may program or configure the functional unit on the smart camera to implement the interface as specified by the function module. The computer system may then program the smart camera (i.e., the smart camera's functional unit), thereby implementing the interface specified in the interface protocol information communicated by the function module. This process may be referred to as initialization of the function module/smart camera.

In another embodiment, the computer system may be operable to deploy the program onto the functional unit of the smart camera. In other words, in addition to, or instead of, programming the smart camera to implement the interface, the computer system may download the program onto the functional unit of the smart camera, after which the smart camera may be operable to execute the program to perform the one or more functions, preferably in conjunction with operation of the function module, and possibly the computer system.

In yet another embodiment, the computer system may be operable to deploy the program onto a function module of the smart camera. In other words, the function module may be programmable by a user (e.g., using the computer system) to perform any of a variety of functions. In another embodiment, a function module may be operable to program the smart camera to perform one or more functions. For example, a function module may be operable to receive a program from the computer system, and program the functional unit of the smart camera to perform the function. In yet another embodiment, the function module may program the smart camera to perform a first portion of a function while the function module performs a second portion of the function. The configured smart camera and the function module may then be operable to perform image acquisition/processing and/or control operations, optionally using the computer system.

In one embodiment, the smart camera may include a housing which encloses a portion or all of the smart camera components, or may be comprised on a frame which primarily provides structural support for the smart camera components. In one embodiment, the housing may have a plurality of sides, e.g., top, bottom, left, right, front and back sides. In another embodiment, the camera may be attached directly to the housing. In one embodiment, the housing may be ruggedized, i.e., adapted for industrial use. In one embodiment, the housing has dimensions less than about 1 foot by about 1 foot by about 1 foot. In another embodiment, the housing has dimensions less than about 1 foot by about 8 inches by about 8 inches. In yet another embodiment, the housing has dimensions less than about 6" by about 6" by about 6".

In one embodiment, the smart camera may include a chassis which comprises a plurality of expansion slots for receiving the function modules. The chassis may include a backplane which provides for electrical communication, and one or more slots for receiving the function modules. For example, the backplane may comprises a bus for communication with function modules. Thus, the smart camera may host a plurality of function modules, each of which may provide DAQ, image processing/analysis, and/or control functionality for an image processing or control operation or task, among others.

In a preferred embodiment, the function modules may be easily removed, added, and replaced. In other words, function modules may be exchanged to change the configuration or capabilities of the smart camera. In one embodiment, the function module may be replaced without powering down the smart camera, i.e., the function module may be "hot-plugged" into the smart camera, where the smart camera and inserted function module may operate without requiring a reboot. For example, in one embodiment, during operation of the smart camera, the function module may communicate the interface protocol information to the smart camera upon attachment, and the smart camera may be programmed in response, as described above. In another embodiment, the function module and/or smart camera may require a reboot or reset after attachment to perform the initialization.

In one embodiment, the smart camera may include local bus interface logic, such as a RTSI (Real Time System Integration) bus for routing timing and triggering signals between the smart camera and one or more other devices or cards, such as function modules, other smart cameras, motion control devices, and/or smart sensors, between two or more function modules, and/or between two or more devices coupled to function modules.

It is noted that the examples presented above are meant to be illustrative only, and are not intended to limit the functionality or use of the function modules to any particular type. Rather, it is contemplated that virtually any function useful in combination with a smart camera may be provided in a modular fashion by one or more function modules. Thus, the function modules may provide a wide variety of functions which may extend the flexibility and utility of the smart camera and therefore expand the applications thereof.

BRIEF DESCRIPTION OF THE DRAWINGS

A better understanding of the present invention can be obtained when the following detailed description of the preferred embodiment is considered in conjunction with the following drawings, in which.

Figure 1A:
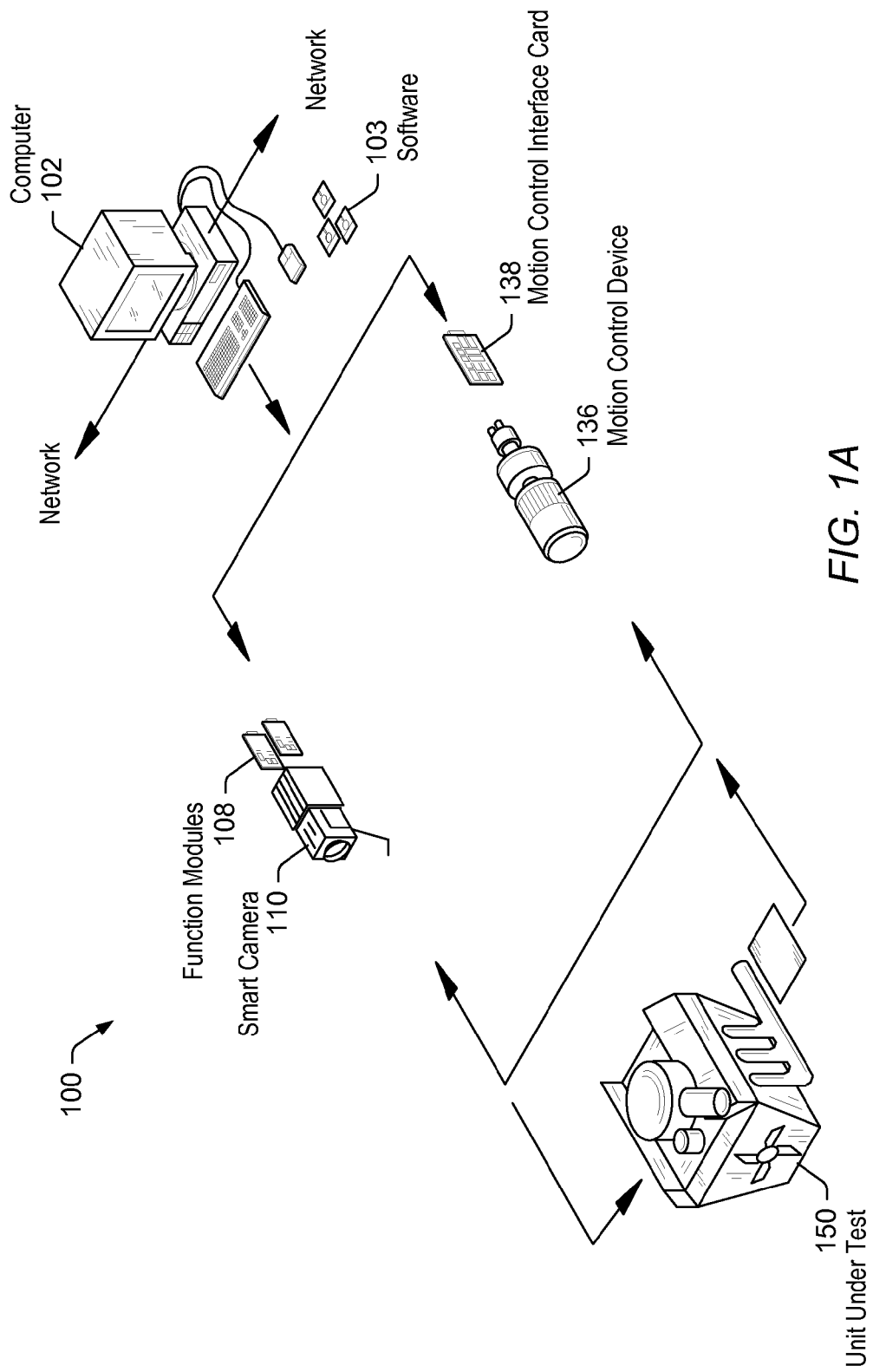
FIGS. 1A-C illustrate various embodiments of an image acquisition/processing system for inspecting manufactured objects.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following patent applications are hereby incorporated by reference in their entirety as though fully and completely set forth herein:

U.S. patent application Ser. No. 10/195,051 titled "Measurement System with Modular Measurement Modules That Convey Interface Information," filed on Aug. 14, 2001, whose inventors are Perry Steger, Garritt W. Foote, David Potter and James J. Truchard.

FIG. 1A—Image Acquisition or Machine Vision System

FIG. 1A illustrates an image acquisition system in which a host computer system 102 is coupled to a smart camera 110. As used herein, the term "smart camera" is intended to include any of various types of devices that are operable to acquire and/or store an image and which include on-board processing capabilities. A smart camera may thus be further operable to analyze or process the acquired or stored image. Examples of a smart camera include analog and digital cameras with on-board processors, and other similar types of devices.

As used herein, the terms "image processing" and "machine vision" are used interchangeably to refer to the processing of images to extract useful information from the image or determine characteristics of the image (or to determine characteristics of one or more objects displayed in the image). The term "image processing" is used herein to refer to both "image processing" and "machine vision", to the extent these terms have different meanings. The term "image processing function" includes tools such as edge detection, blob analysis, pattern matching, Fourier analysis, and other image processing functions. The term "image processing function" may also include an operation or decision that is performed in response to the information extracted or characteristics determined from the image, e.g., a control function. The term "image processing function" is also intended to include an image processing (or machine vision) algorithm that combines a sequence of two or more image processing functions or tools and/or decision operations that process an image in a desired way or which implement an image processing or machine vision application, such as part inspection, automated assembly, image analysis, pattern matching, edge detection, etc.

As used herein, the term "functional unit" may include a processor and memory or a programmable hardware element. The term "functional unit" may include one or more processors and memories and/or one or more programmable hardware elements. As used herein, the term "processor" is intended to include any of types of processors, CPUs, microcontrollers, or other devices capable of executing software instructions. As used herein, the term "programmable hardware element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware.

As used herein, the term "memory medium" includes a non-volatile medium, e.g., a magnetic media or hard disk, optical storage, or flash memory; a volatile medium, such as computer system memory, e.g., random access memory (RAM) such as DRAM, SRAM, EDO RAM, RAMBUS RAM, DR DRAM, etc.; or an installation medium, such as software media 103, e.g., a CD-ROM, or floppy disks, on which the computer programs may be stored. The term "memory medium" may also include other types of memory or combinations thereof.

In the present application, the term "graphical program" or "block diagram" is intended to include a program comprising graphical code, e.g., two or more nodes or icons interconnected in one or more of a data flow, control flow, or execution flow format, where the interconnected nodes or icons may visually indicates the functionality of the program. Thus the terms "graphical program" or "block diagram" are each intended to include a program comprising a plurality of interconnected nodes or icons which visually indicates the functionality of the program. A graphical program may comprise a block diagram and may also include a user interface portion or front panel portion. The user interface portion may be contained in the block diagram or may be contained in one or more separate panels or windows. A graphical program may be created using any of various types of systems which are used to develop or create graphical code or graphical programs, including LabVIEW, DASYLab, and DiaDem from National Instruments, Visual Designer from Intelligent Instrumentation, Agilent VEE (Visual Engineering Environment), Snap-Master by HEM Data Corporation, SoftWIRE from Measurement Computing, ObjectBench by SES (Scientific and Engineering Software), Simulink from the MathWorks, WiT from Coreco, Vision Program Manager from PPT Vision, Hypersignal, VisiDAQ, VisSim, and Khoros, among others. In the preferred embodiment, the system uses the LabVIEW graphical programming system available from National Instruments.

Thus, FIG. 1A illustrates an exemplary image acquisition or machine vision system 100, where the smart camera 110 may include a functional unit for performing an image processing function as described below. As FIG. 1A shows, the smart camera 110 may include one or more function modules 108 which may provide various additional functions for the smart camera as will be described below. The smart camera 110 may couple to the host computer 102 through a serial bus, a network, or through other means.

The host computer 102 may comprise a CPU, a display screen, memory, and one or more input devices such as a mouse or keyboard as shown. The computer 102 may operate with the smart camera 110 to analyze, measure or control a device or process 150. Alternatively, the computer 102 may be used only to configure a functional unit in the image acquisition device or one or more of the function modules 108. In other embodiments, the computer 102 may be omitted, i.e., the smart camera 110 may operate completely independent of the computer.

The image acquisition system 100 may be used in an manufacturing assembly, test, measurement, automation, and/or control application, among others. For illustration purposes, a unit under test (UUT) 150 is shown which may be positioned by a motion control device 136 (and interface card 138), and imaged and analyzed by the smart camera 110. It is noted that in various other embodiments the UUT 150 may comprise a process or system to be measured and/or analyzed.

Referring again to FIG. 1A, the smart camera 110 may include a memory medium on which computer programs, e.g., text based or graphical programs, may be stored. In other embodiments, configuration information may be stored which may be used to configure a programmable hardware element, such as a field programmable gate array (FPGA), comprised in the smart camera (or a function module, or the computer) to perform a measurement, control, automation, or analysis function, among others.

The host computer 102 may also include a memory medium on which computer programs may be stored. In one embodiment, another memory medium may be located on a second computer which is coupled to the smart camera 110 or to the host computer 102 through a network, such as a local area network (LAN), a wide area network (WAN), a wireless network, or the Internet. In this instance, the second computer may operate to provide the program instructions through the network to the smart camera 110 or host computer 102 for execution.

Figure 1B:
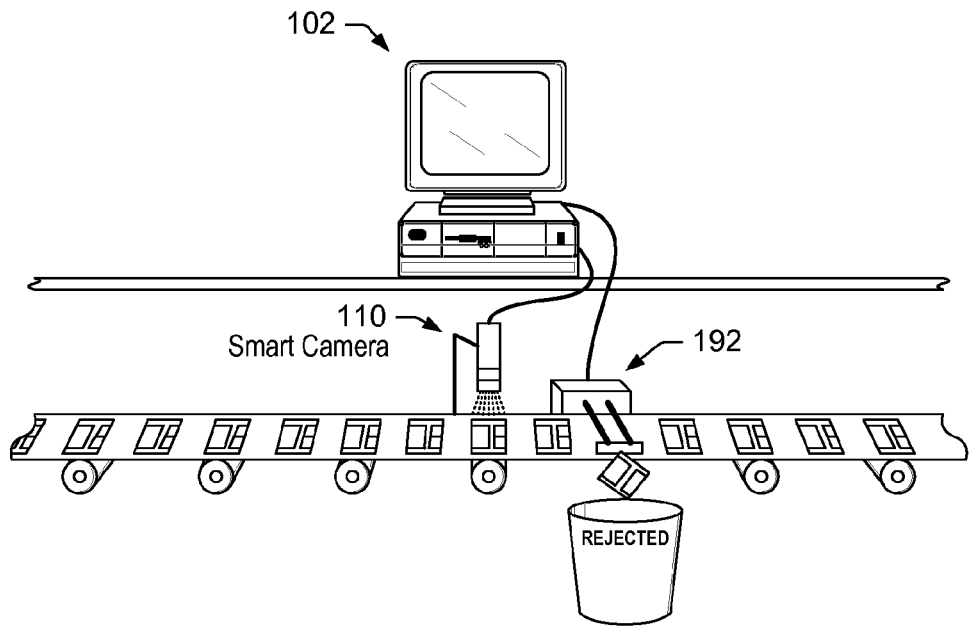
Figure 1C:
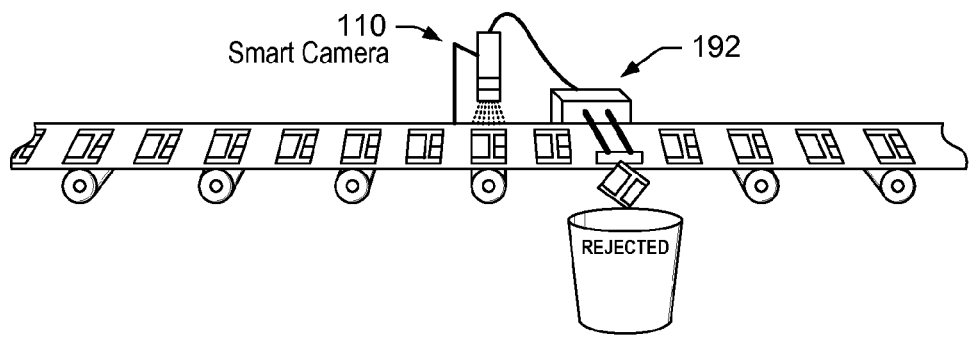

FIGS. 1B and 1C—Image Processing Systems

FIGS. 1B and 1C illustrate image processing or machine vision systems according to various embodiments of the invention. The image processing system of FIG. 1B may comprise a computer 102 and a smart camera 110, and may further include a motion control device 192. In one embodiment, the image processing system of FIG. 1C may comprise smart camera 110 and motion control device 192, and may not include computer system 102.

The smart camera 110 may include a digital camera that acquires a digital video signal which comprises an image, or a sequence of images, or other data desired to be acquired. In one embodiment, the smart camera 110 may instead include an analog camera that acquires an analog video signal, and the smart camera 110 may further include A/D converters for converting the analog video signal into a digital image.

As mentioned above, the smart camera 110 may include a functional unit configured according to a program, e.g., a text-based or graphical program. For example, the functional unit may be configured to perform an image processing function as represented by a graphical program. Thus a graphical (or text-based) program may have been first created to perform the image processing function, such as with a graphical development environment on the computer system 102, and the graphical program may then have been deployed onto the functional unit of the smart camera to implement the image processing function.

In the machine vision system of FIG. 1B, the digital video signal or digital image may be provided to the functional unit in the smart camera 110, wherein the image processing function is performed. In one embodiment, the functional unit in the smart camera 110 may perform a first portion of the image processing function, and the computer 102 may perform a second portion of the image processing function. For example, the functional unit in the smart camera 110 may perform the actual processing of the image to determine characteristics of the image, and the computer 102 may then perform an operation based on this result, such as rejecting a part from an assembly line, or logging the results to file. As another example, the functional unit in the smart camera 110 may perform the processing of the image to determine characteristics of the image, and may also optionally perform an operation based on this result, and the computer system 102 may execute software to provide a user interface for the system, e.g., the computer system 102 may execute a user interface portion of a graphical program, where the block diagram of the graphical program is used to configure the functional unit in the smart camera 110. Thus, in one embodiment, a first portion of the graphical program, e.g., DSP functions requiring real time performance, may be executed by the smart camera, i.e., the functional unit or a function module 108 comprised in the smart camera 110, and a second portion of the graphical program, e.g., a user interface where real time performance is not required, may be executed by the computer system 102.

In the embodiment of FIG. 1C, the functional unit and/or the function module 108 in the smart camera 110 may perform all of the desired image processing function, including optionally performing an operation based on determined characteristics of the image, and hence the computer system 102 may not be necessary during operation of the system. In another embodiment, the smart camera 110 may include a processor and memory (in addition to the functional unit which executes the image processing function) which may execute the second portion of the graphical program, e.g., the user interface portion. For example, a function module 108 may execute the user interface portion of the program.

In the embodiments of FIGS. 1B and 1C, the functional unit in the smart camera 110 (or the function module 108, or the computer system 102 in FIG. 1B) may control the motion control device 192. Examples of motion control functions include moving a part or object to be imaged by a camera, rejecting a part on an assembly line, or placing or affixing components on a part being assembled, or a robotics application, among others.

Figure 1D:
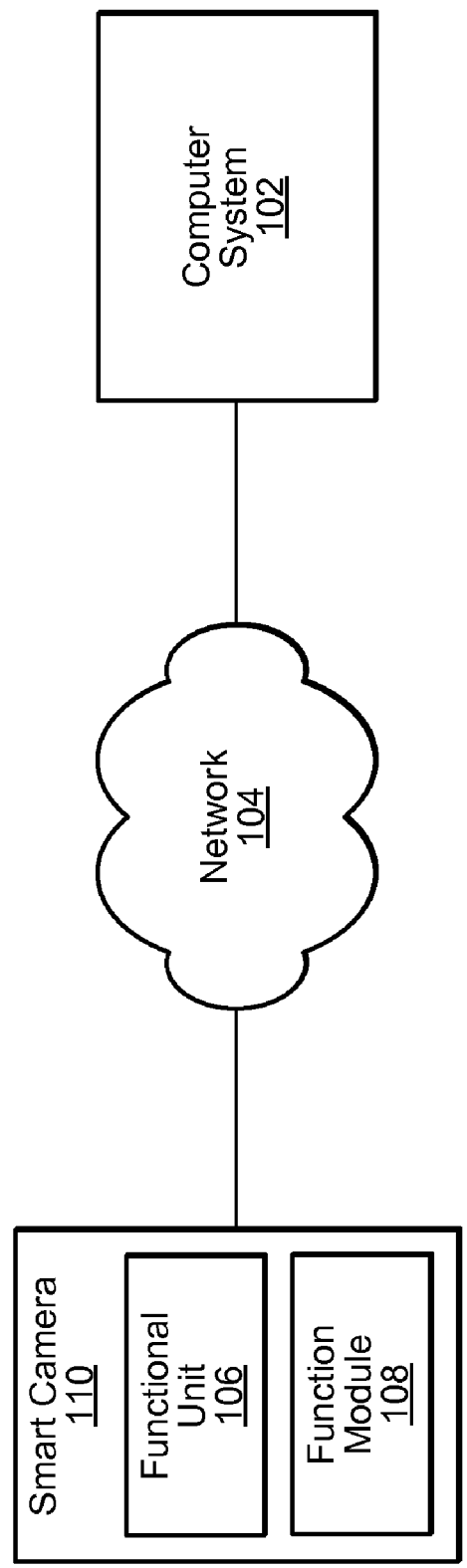
FIG. 1D is a block diagram of a smart camera coupled to a computer system via a network.

FIG. 1D—Block Diagram of an Image Acquisition System

FIG. 1D is a block diagram of an image acquisition system, according to another embodiment of the invention. As FIG. 1D shows, the smart camera 110 may be coupled to computer system 102 via a network (e.g., the Internet) 104 as shown, or, as mentioned above, may be coupled to the computer system 102 by other transmission means, including serial or parallel bus, wireless, and CAN, among others. As FIG. 1D also shows, the smart camera 110 may include a functional unit 106, e.g., a processor and memory and/or a programmable hardware element, such as an FPGA, which may be operable to perform image processing and/or analysis on an acquired image. The functional unit 106 may be programmed by computer system 102, thus, the smart camera 110 may be re-configurable, i.e., programmable by an external computer system. Additionally, the smart camera 110 may include one or more function modules 108, which may be operable to perform a variety of functions, such as image processing, pattern recognition, I/O functions, and network communications, among others.

As noted above, function modules 108 may be inserted into slots of the smart camera to configure the smart camera for desired operations. In one embodiment, the smart camera 110 together with the function module(s) 108 may operate as a measurement or control device. For example, in one embodiment, the function module may be operable to couple to a sensor, where the sensor is operable to send sensor signals to the function module for one or more of signal conditioning and signal conversion. The signal conditioning may include one or more of protection, isolation, filtering, amplification, and excitation. The signal conversion may include one or more of analog to digital (A/D) conversion and digital to analog (D/A) conversion. Thus, the function module 108 may be operable to perform signal conditioning and/or signal conversion on signals sent by a sensor coupled to the function module 108 (not shown), and to transmit results of such processing on to the smart camera 110.

In another embodiment, the function module 108 may include a sensor as well as the signal conditioning and/or conversion logic, and so the function module may be operable to perform one or more of signal conditioning and signal conversion on sensor signals received from the sensor comprised on the function module 108.

One or more of the function modules 108 may include a functional unit, such as a processor and memory, or an FPGA. Thus, the function module may operate to provide co-processing functionality to the smart camera. For example, in one embodiment, the function module may perform an image processing function, such as pattern matching, blob analysis, edge detection, etc., on an acquired image. Thus, at least a portion of the computation load which might normally be handled by the functional unit of the smart camera may be off-loaded to the function module. Additionally, dedicated processing functions may be provided by the function module(s) which may exceed the capabilities of the smart camera functional unit.

In another embodiment, multiple function modules 108 may be used in conjunction to perform image processing, measurement, and/or control tasks. For example, a first function module 108 may include a sensor, such as a thermocouple, pressure sensor, or strain gauge, while a second function module 108 may perform signal conditioning and/or conversion on signals received from the first function module 108. The smart camera 110 may communicate with both the first and the second function modules 108 and perform an action, such as generating an image, based on signals received from both the first and the second function modules 108.

For example, a function module 108 may receive signals from a temperature sensor and perform signal conditioning and/or signal conversion on the signals to generate a scaled temperature value. The temperature value may be transmitted to the functional unit 106 on the smart camera 110 which may compare the value to a threshold, and if the value exceeds the threshold, the smart camera may generate/capture an image. Furthermore, if one of the function modules includes a functional unit, the function module may perform an image processing function on the acquired image, as noted above.

In another example, a function module 108 may comprise a sensor, such as a photometer or light meter, which operates to ascertain ambient conditions for the smart camera 110, such as brightness. The smart camera 110 may use readings from the sensor to set parameters for image capture, such as shutter speed, in order to optimize image quality. In yet another example, a function module 108 may comprise a motion detector which may be operable to send a trigger to the smart camera 110 when motion is detected, thus causing an image of the moving phenomenon to be generated.

In one embodiment, the smart camera 110 may be operable to receive data from the function module 108 and communicate the data (possibly in a different format or form) to the computer system 102, e.g., over the network 104. For example, the smart camera 110 may receive signal data in a proprietary format from the function module 108 and format the data for transmission over wireless Ethernet to the computer system 102. In another embodiment, the function module 108 may provide network communication functionality to the smart camera, thereby allowing the smart camera 110 to send image data to external systems or to publish image data on a website, for example.

In another embodiment, a function module 108 may include a functional unit or control logic which may be operable to control an actuator, such as a stepping motor, to perform a motion task. The smart camera 110 may analyze image information and communicate results to the function module 108, and thus may use the function module 108 to perform a machine vision task.

In other embodiments, function modules 108 may perform such tasks as timing, alarms, logging, synchronization, etc. For example, when a plurality of smart cameras 110 are used, the function modules 108 may provide synchronization functions to the smart cameras 110, thereby facilitating coordinated operation of the plurality of smart cameras 110. In one embodiment, one of the smart cameras 110 may operate as a master unit, while the other smart cameras 110 operate as slaves, where the smart cameras' 110 respective function modules 108 provide the synchronization functionality as appropriate depending on the master/slave status of the smart camera 110. In another embodiment, each of the plurality of smart cameras 110 may operate as a peer, where the function modules 108 coordinate the respective smart camera 110 operations in a peer-to-peer manner.

In one embodiment, a plurality of smart cameras 110 may be coupled to each other via a network, e.g., through wireless means, thereby implementing a distributed machine vision, where the communication and/or coordination functionality is provided at least in part by the smart cameras' 110 respective function modules 108. For example, multiple smart cameras 110 may each acquire an image of an object, then collectively analyze the different images of the object to generate three dimensional information about the object. Thus, the function module 108 may comprise connectivity to one or more other smart cameras 110, providing for coordinated operations between the smart camera 110 and the one or more other smart cameras 110.

In another embodiment, the function module may include a gyroscope which may stabilize the smart camera, allowing for precise control of the camera's orientation. In one embodiment, the function module may have a small form factor which may enable deployment of the smart camera with minimal space requirements.

In one embodiment, the smart camera 110 may be operable to receive interface protocol information from the function module 108 specifying how to operate or interface with the function module 108. The smart camera 110 may then communicate the interface protocol information to the computer system 102 and, based on the interface protocol information, the computer system 102 may program or configure the functional unit 106 on the smart camera 110 to implement the interface as specified by the function module 108. In other words, the function module 108 may tell the smart camera 110 how to communicate, and the smart camera 110 may then tell the computer system 102 how to program the smart camera 110 to communicate with the function module 108 accordingly. The computer system 102 may then program the smart camera 110 (i.e., the smart camera's 110 functional unit 106), thereby implementing the interface specified in the interface protocol information communicated by the function module 108. This process may be referred to as initialization of the function module/smart camera.

Referring again to FIG. 1D, the smart camera 110, function module 108, and/or the computer 102 may include a memory medium on which computer programs, e.g., text based and/or graphical programs, according to the present invention may be stored. A memory medium may also be located on a second computer which is coupled to the system through a network, such as a local area network (LAN), a wide area network (WAN), or the Internet. In this instance, the second computer may operate to provide the program instructions through the network to the system (i.e., the smart camera 110, the function module 108, and/or the computer 102) for execution. Also, the computer system 102 may take various forms, including a personal computer system, mainframe computer system, workstation, network appliance, Internet appliance, personal digital assistant (PDA), television set-top box, instrument, or other device. In general, the term "computer system" can be broadly defined to encompass any device having at least one processor which executes instructions from a memory medium.

In one embodiment, the computer system 102 may also store a program implementing one or more image processing, control, and/or measurement functions, e.g., a software program, such as a text-based or graphical program, implementing the one or more functions. The term "measurement function" may include measurement and/or data acquisition, such as displaying received data, analyzing and/or processing received data to generate a result, performing signal processing on received data, or otherwise analyzing and/or processing received data to perform a measurement.

In one embodiment, the computer system 102 may be operable to execute the program to perform the one or more functions, preferably in conjunction with operation of the smart camera 110 and/or function module 108. For example, the program may be executable to perform one or more of image processing, DAQ, measurement, or control functions, including analysis of image data or signals received from the smart camera, control of smart camera and/or function module operations, user interface functions, and pattern recognition and/or characterization, among others.

In another embodiment, the computer system 102 may be operable to deploy the program onto the functional unit 106 of the smart camera 110. In other words, in addition to, or instead of, programming the smart camera 110 to implement the interface, the computer system 102 may download the program onto the functional unit 106 of the smart camera 110, after which the smart camera 110 may be operable to execute the program to perform the one or more functions, preferably in conjunction with operation of the function module 108, and possibly the computer system 102.

In yet another embodiment, the computer system 102 may be operable to deploy the program onto the function module 108 of the smart camera 110. In other words, the function module 108 may be programmable by a user (e.g., using the computer system 102) to perform any of a variety of functions. In another embodiment, a function module 108 may be operable to program the smart camera 110 to perform one or more functions. For example, a function module 108 may be operable to receive a program from the computer system 102, and program the functional unit 106 of the smart camera 110 to perform the function. In yet another embodiment, the function module 108 may program the smart camera 110 to perform a first portion of a function while the function module 108 performs a second portion of the function.

The configured smart camera 110 and the function module 108 may then be operable to perform image acquisition/processing and/or control operations, optionally using the computer system 102.

It is noted that the examples presented above are meant to be illustrative only, and are not intended to limit the functionality or use of the function modules 108 to any particular operation. Rather, it is contemplated that virtually any function useful in combination with a smart camera 110 may be provided in a modular fashion by one or more function modules 108. Thus, the function modules 108 may provide a wide variety of functions which may extend the flexibility and utility of the smart camera 110 and therefore expand the applications thereof.

Figure 2A:
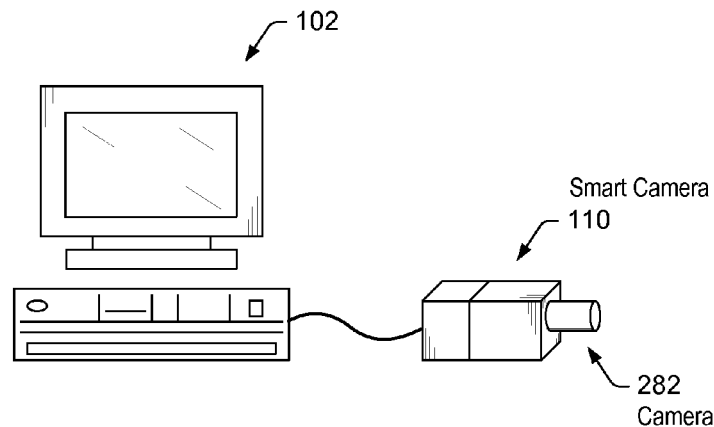
FIG. 2A illustrates a machine vision system according to one embodiment.
Figure 2B:
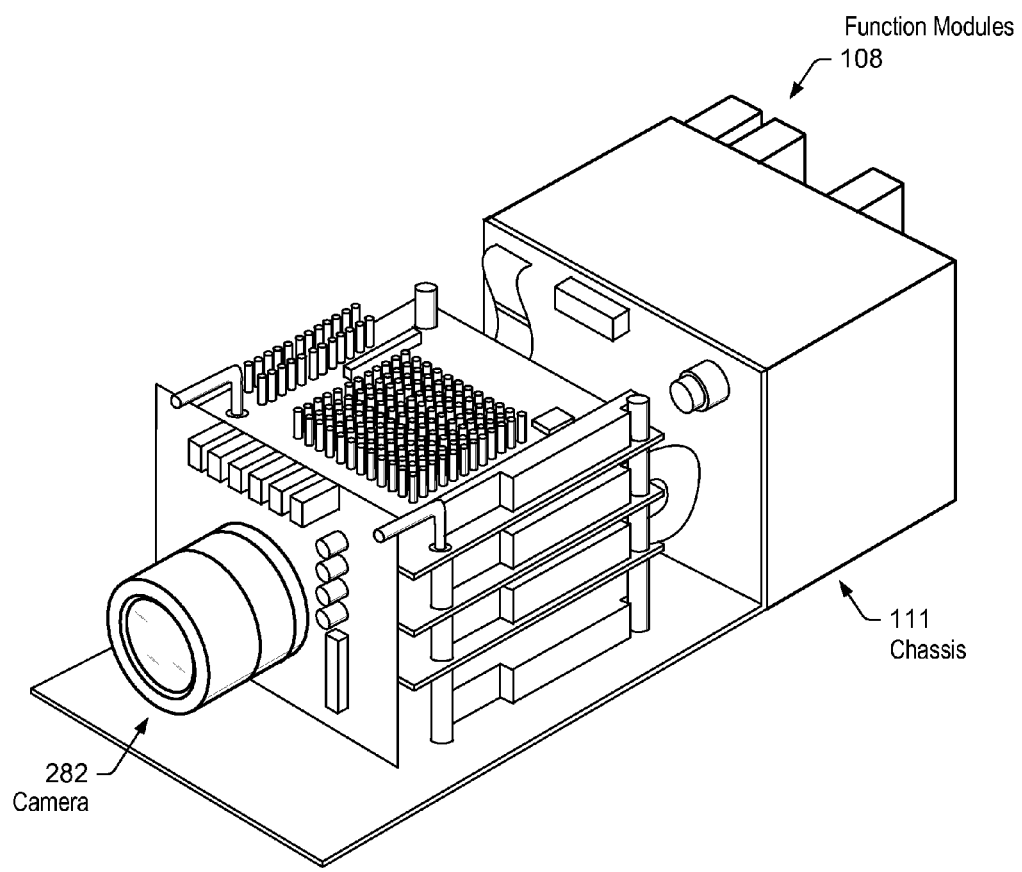
FIG. 2B illustrates a smart camera with function modules, according to one embodiment of the invention.

FIGS. 2A and 2B—Image Acquisition System Having a Smart Camera

FIGS. 2A and 2B illustrate an image acquisition system with a smart camera 110. As FIGS. 2A and 2B illustrate, the smart camera 110 may include a housing which encloses a portion or all of the smart camera 110 components, or may be comprised on a frame which primarily provides structural support for the smart camera 110 components. In one embodiment, a camera 282 may be attached directly to the housing. In one embodiment, the housing may have a plurality of sides. For example, the plurality of sides may comprise top, bottom, left, right, front and back sides. Therefore, the smart camera 110 may include a housing having a plurality of sides and a camera 282 directly attached to the housing for acquiring an image of an object.

FIG. 2A—Image Acquisition System with Smart Camera

FIG. 2A illustrates an image acquisition system comprising computer system 102 coupled to the smart camera 110. The smart camera 110 is an example of an image acquisition device. As indicated above, the term "smart camera" is intended to include any of various types of devices that include a camera 282 or other image sensor and a functional unit 106 capable of being configured to perform an image processing function to analyze or process an acquired image. For example, while traditional computer vision is based on a camera/computer system in which the image processing or understanding algorithm is embedded in the computer system 102, the computational load of vision algorithms may be circumvented or mitigated by merging low level processing with the camera or sensor in a single module. For example, a hardware architecture may be defined in a Hardware Description Language (e.g., VHDL), simulated and synthesized into digital structures that can then be configured in a Field Programmable Gate Array (FPGA). In one application of a smart camera 110, the flexibility of an FPGA may be combined with a sensor for real time image processing. In another application of a smart camera 110, the flexibility of a processor and memory may be combined with a sensor for real time image processing. Additionally, as mentioned above, the smart camera 110 may include function modules 108 which may be operable to provide a variety of image processing, I/O, control, automation, and/or communication functions to the smart camera 110.

The computer system 102 shown in FIG. 2A may include a memory medium. In one embodiment, the memory medium may store a development environment, such as a graphical programming development system, for developing programs for execution by the functional unit 106 on the smart camera 110, or by a function module 108 comprised therein. For example, the graphical programming development system may be used to develop a graphical program that implements an image processing function.

As mentioned above, the smart camera 110 may include a functional unit 106, which may be a programmable hardware element (programmable or reconfigurable hardware), e.g., an FPGA, and/or a processor and memory. The functional unit 106 in the smart camera 110 may be configured with a program that implements the image processing function. The smart camera 110 may also comprise a camera 282 coupled to the functional unit 106. The smart camera 110 may also include a memory (a memory medium) coupled to the camera 282 for storing an acquired image. If the smart camera 110 includes an analog camera, the smart camera 110 may further include analog to digital (A/D) logic for converting analog image signals into a digital image for storage in the memory. The smart camera 110 may also optionally include timer/counter logic that may perform timing/counting operations, e.g., during operation of the functional unit 106.

As mentioned above, and as FIG. 2A shows, in one embodiment, the smart camera 110 may include a housing which encloses some or all of the components of the smart camera 110. For example, the camera 282 may be included in the housing. In one embodiment, the housing may be ruggedized, i.e., adapted for industrial use. In one embodiment, the housing may comprise a Personal Digital Assistant (PDA).

Furthermore, as also mentioned above, the functional unit 106 may be comprised in the housing and coupled to the camera 282, where the functional unit 106 is configurable to implement an image processing function. A backplane may also be comprised in the housing, where the backplane is coupled to the functional unit 106 and is operable to provide for electrical communication. One or more slots may also be comprised in the housing, where each of the one or more slots includes a connector that is electrically coupled to the backplane, and where each of the one or more slots is adapted for receiving a function module 108. In one embodiment, the one or more slots may comprise a plurality of slots, i.e., two or more slots.

In one embodiment, the housing has dimensions less than about 1 foot by about 1 foot by about 1 foot. In another embodiment, the housing has dimensions less than about 1 foot by about 8 inches by about 8 inches. In yet another embodiment, the housing has dimensions less than about 6" by about 6" by about 6".

FIG. 2B—Smart Camera

FIG. 2B illustrates another embodiment of a smart camera 110. As FIG. 2B shows, the smart camera includes a camera 282, coupled to circuitry/logic (e.g., one or more circuit boards) for performing various image processing and/or acquisition functions. As mentioned above, the circuitry/logic may include a functional unit 106, such as a programmable hardware element, e.g., an FPGA and/or a processor and memory. As also described above, the functional unit 106 in the smart camera 110 may be configured with a program that implements the image processing function, and may also include a memory coupled to the camera 282 for storing an acquired image. If the camera 282 is an analog camera, the smart camera 110 may further include analog to digital (A/D) logic for converting analog image signals into a digital image for storage in the memory. In one embodiment, the functional unit 106 may be operable to provide signal conditioning on signals from the analog camera. In another embodiment, the functional unit 106 may be operable to provide signal conversion on signals from the analog camera.

The smart camera 110 may also optionally include timer/counter logic that may perform timing/counting operations, e.g., during operation of the programmable hardware element. The smart camera 110 may also include various I/O ports for communicating with external devices, such as computer system 102. As FIG. 2B shows, in one embodiment, the smart camera 110 may include a frame or structure to support the components comprised in the smart camera 110. In one embodiment, the smart camera 110 may include a "PC-on-a-Card" which may provide part or all of the functionality of a personal computer.

As FIG. 2B also shows, the smart camera 110 may include a chassis 111 which includes a plurality of expansion slots for receiving function modules 108. The function modules 108 may thus provide a mechanism for expanding the capabilities of the smart camera 110 in an easy modular fashion.

In one embodiment, the smart camera 110 may also include a function module 108 comprised in one of the slots, which may provide modular functionality to the smart camera 110. For example, the function module 108 may provide dedicated image processing, including one or more of pattern recognition, Fourier analysis (or other transform analysis), motion detection; communication functionality, such as wired and/or wireless network connectivity, e.g., Ethernet and Internet network connectivity, USB connectivity, and Firewire (IEEE 1134) connectivity, among others. In one embodiment, the function module may be programmable over a network, such as by a computer system 102. In another embodiment, the functional unit 106 may be programmable by the function module 108 to perform an image processing function. In yet another embodiment, the functional unit 106 comprised in the smart camera 110 may be programmable over a network.

A block diagram of an exemplary embodiment of the smart camera 110 is shown in FIG. 4, described below.

Figure 3:
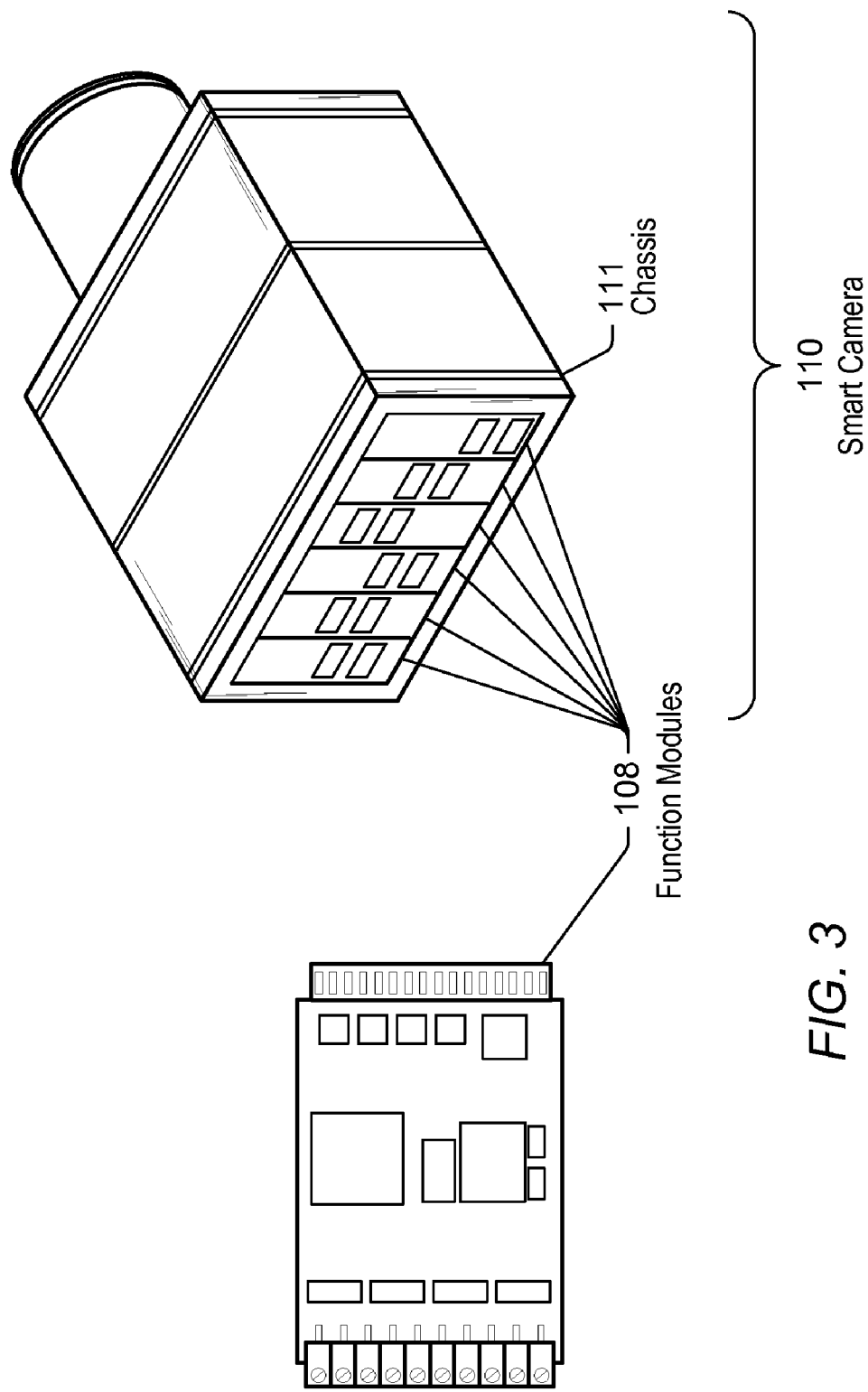
FIG. 3 is an illustration of a smart camera with function modules, according to one embodiment.

FIG. 3—Smart Camera with Chassis and Function Modules

FIG. 3 illustrates an embodiment of the invention where each function module 108 is in the form of a cartridge and the smart camera 110 includes the chassis 111, also referred to as a cartridge carrier, which may be operable to receive one or more of the function modules 108. In a preferred embodiment, the chassis 111 may be operable to receive a plurality of the function modules 108.

As mentioned above, in one embodiment, the chassis 111 may include a backplane which provides for electrical communication, and one or more slots for receiving the function modules 108. For example, the backplane may comprise a bus for communication with function modules 108, including one or more of ISA, EISA, PCI, SPCI, PCI-X, CompactPCI, PXI, VXI, VMEbus, PC/104, PC/104 Plus, SCXI, PCMCIA, CardBus, PMC (PCI Mezzanine Card), MicroDAQ, Smart Card, CompactFlash, 3GIO, and USB, among others. Correspondingly, the function modules may each have a form factor in accordance with a corresponding one of ISA, EISA, PCI, SPCI, PCI-X, CompactPCI, PXI, VXI, VME, PC/104, PC/104 Plus, SCXI, PCMCIA, PC Card, PMC (PCI Mezzanine Card), MicroDAQ, Smart Card, CompactFlash, 3GIO and USB.

Each of the one or more slots may include a connector that is coupled to the backplane, where each of the one or more slots may be adapted for receiving one of the function modules 108. Thus, the smart camera 110 may host a plurality of function modules 108, each of which may provide DAQ, image processing/analysis, and/or control functionality for an image processing or control operation or task, among others.

The chassis 111 may include one or more carriers which are able to convert function module 108 signals to standard bus/network signals, and implement power-on states, plug and play, and/or watchdogs, these features being well known in the art. Example carriers may include, but are not limited to, 4-slot Ethernet carrier, 4-slot and 1-slot USB carrier, multi-slot RIO carrier, 1-slot wireless carrier, and CAN carrier, among others.

As mentioned above, in one embodiment, the smart camera 110 may be operable to communicate with each function module 108 and be programmed or configured (e.g., by a computer system 102) to implement the respective interface of each function module 108. In this manner a suite of sensors may be fielded, each of which feeds signals to a respective function module 108 which in turn communicates through a respective interface (protocol) with the smart camera 110. Thus, in one embodiment the smart camera 110 may support a heterogeneous plurality of interfaces without having to include a heterogeneous set of interface hardware components.

It should be noted that in a preferred embodiment, the function modules 108 (cartridges) may be easily removed, added, and replaced. In other words, function modules 108 may be exchanged to change the configuration or capabilities of the smart camera 110. In one embodiment, the function module 108 may be replaced without powering down the smart camera 110, i.e., the function module 108 may be "hot-plugged" into the smart camera 110, where the smart camera 110 and inserted function module 108 may operate without requiring a reboot. In other words, any initialization required may be performed without a reboot. For example, in one embodiment, during operation of the smart camera 110, the function module 108 may communicate the interface protocol information to the smart camera 110 upon attachment, and the smart camera 110 may be programmed in response, as described above. In another embodiment, the function module 108 and/or smart camera 110 may require a reboot or reset after attachment to perform the initialization.

For example, during operation of the smart camera 110, a new function module 108 may be added (i.e., inserted or attached) to the smart camera 110. The smart camera 110 may automatically perform the initialization with respect to the new function module 108. In the example given above where the new function module 108 communicates the interface to the smart camera 110 during operation of the smart camera 110, the new function module 108 may communicate respective interface information to the smart camera 110, which may then be programmed (e.g., by the computer system 102) to implement the respective interface, thereby enabling operations with the new function module 108. In another embodiment, the new function module 108 itself may program the smart camera 110 with the appropriate interface. In one embodiment, the new function module 108 may replace another function module 108 which was removed during operation of the smart camera 110.

In one embodiment, the function module 108 may provide functionality including one or more of signal conditioning, ADC, microprocessor, and optional isolation, for sensor to digital operations. Additionally, in one embodiment, the new function module 108 may provide a PXI interface, and Electronic Data Sheet (EDS)/calibration history on board. In one embodiment, the function module 108 may have a small form factor. For example, in one embodiment, the function module 108 may have dimensions less than or equal to approximately 1 inch by 2 inches by 3 inches. In one embodiment, the function module may have dimensions of approximately 0.2 inches by 1 inch by 1 inch or more. Thus, in a preferred embodiment, the function module 108 has a compact form factor which may enable deployment of the smart camera 110 with minimal space requirements.

Thus, in various embodiments, the function modules 108 may provide communication, integrated signal conditioning, optional isolation, support for plug and play sensors (IEEE 1451.4), modular image processing, control functionality, and easy use and configuration, among other functions. Additionally, the function modules 108 may be rugged, i.e., may be suitable for industrial use. In various embodiments, the function modules 108 may plug into one or more of an Ethernet carrier, a USB carrier, an EthernetVision I/O slot, a PXI carrier, a PCI carrier, handhelds, DAQ in the cable, and RIO devices (e.g., panelettes), among others. Other example functions contemplated for function modules 108 include, but are not limited to, DSP (Digital Signal Processing), ASP (Analog Signal Processing), displays, GUI's, thermocouples, analog (e.g., 10V) inputs, fast analog inputs allowing vibration analysis, analog output (e.g., 1V to 10V), digital input (e.g., 5V to 30V), digital output (e.g., 5V to 30V), analysis, decision-making, pattern recognition, and stabilization. Thus, some or all of the functions listed herein may be performed by one or more function modules comprised in the smart camera 110, described in more detail below.

Figure 4A:
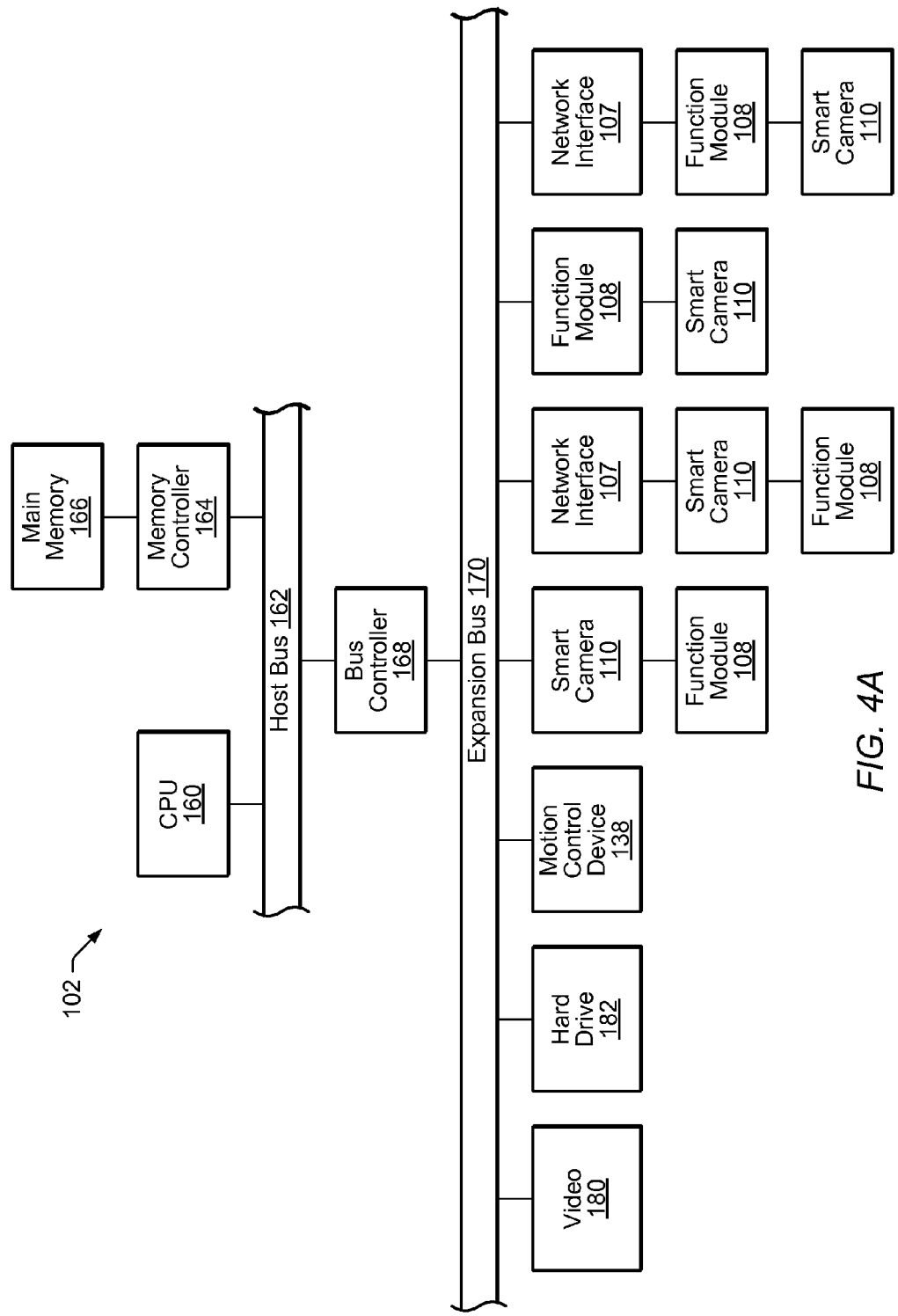
FIG. 4A is an exemplary block diagram illustrating one embodiment of the computer system illustrated in FIGS. 1A-1D and FIG. 2A.

FIG. 4A—Computer System Block Diagram

FIG. 4A is an exemplary block diagram of one embodiment of the computer system 102 illustrated in FIGS. 1A-1D and FIG. 2A. It is noted that any type of computer system configuration or architecture can be used as desired, FIG. 4A illustrating a representative PC embodiment. For example, the computer system 102 may be a general purpose computer system, a computer implemented on a PXI card installed in a PXI chassis, a computer implemented on a VXI card installed in a VXI chassis, or other type of computer system. The elements of a computer not necessary to understand the present invention have been omitted from FIG. 4A for simplicity.

The computer system 102 preferably includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store software according to one embodiment of the present invention, e.g., image processing software. The main memory 166 may also store operating system software, i.e., software for operation of the computer system, as is well known to those skilled in the art.

The host bus 162 may couple to an expansion or input/output bus 170 by means of a bus controller 168 or bus bridge logic. The expansion bus 170 is preferably the PCI (Peripheral Component Interconnect) expansion bus, although other bus types may be used. The expansion bus 170 may include slots for a plurality of devices including a smart camera 110 with inserted function module(s) 108, as well as various other devices such as a motion control interface card 138, a video display subsystem 180 and hard drive 182 coupled to the expansion bus 170.

FIG. 4A also illustrates several exemplary ways of coupling of the smart camera 110 to the computer system 102. In one embodiment, the smart camera 110 may be coupled to the computer system 102 via the expansion bus 170. In another embodiment, the smart camera 110 may be coupled to the computer system 102 via a network, thus, the computer 102 may also include a network interface 107 to facilitate communication between the smart camera 110 and the computer 102. In another embodiment, the smart camera 110 may be coupled to the computer system through a function module 108, which in turn may be coupled to the computer system 102 via the expansion bus 170 or the network interface 107.

Figure 4B:
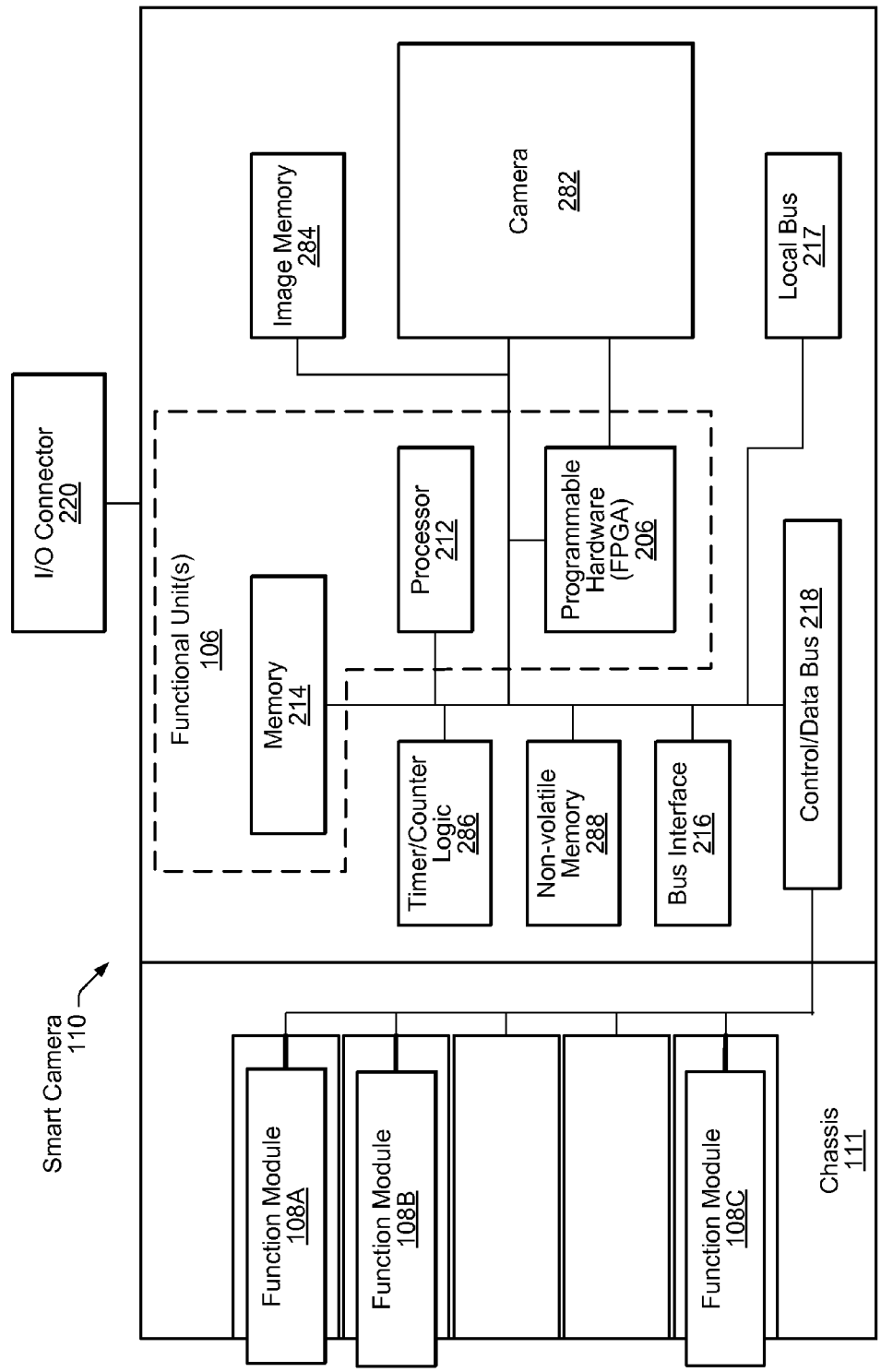
FIG. 4B is a block diagram of a smart camera with function modules, according to one embodiment.

FIG. 4B—Smart Camera Block Diagram

FIG. 4B is a block diagram of a smart camera 110 with programmable hardware. As may be seen, this embodiment uses a combination of processor/memory and programmable hardware 206, e.g., FPGA, to perform image processing (and/or other) functions. For example, the programmable hardware 206 element in the smart camera 110 may be configurable to perform an image processing function on an acquired image. It should be noted that this embodiment is meant to be illustrative only, and is not intended to limit the architecture, components, or form of the smart camera 110.

The embodiment of the smart camera 110 illustrated in FIG. 4B includes a camera 282 and a functional unit 106. In this embodiment, the functional unit 106 may comprise a programmable hardware element 206, e.g., a field programmable gate array (FPGA) such as those available from Xilinx, Altera, etc., and may also comprise a processor 212 and memory 214. The programmable hardware element 206, processor 212 and memory 214 may each be coupled to the camera 282 and/or to an image memory 284.

As shown, the smart camera 110 may also include a non-volatile memory 288 coupled to the programmable hardware element 206, the processor 212, the memory 214 and the image memory 284. The non-volatile memory 288 may be operable to store a hardware description and/or program received from the computer system 102 to enable execution of the functional unit 106 prior to or during booting of the computer system 102.

The smart camera 110 may also include an I/O connector 220 which is operable to send and receive signals. The I/O connector 220 may present analog and/or digital connections for receiving/providing analog or digital signals. For example the I/O connector 220 may enable the smart camera 110 to communicate with computer system 102 to receive a program for performing image processing (and/or other) functions. Thus a program can be created on the computer system 102, or on another computer in a networked system, and at least a portion of the program can be deployed onto the functional unit 106 of the smart camera 110, and/or a function module 108 (e.g., 108A, 108B, or 108C) comprised in the smart camera 110.

As noted above, the smart camera 110 may include a dedicated on-board processor 212 and memory 214 in addition to the programmable hardware element 206. This enables a first portion of the program to be compiled into machine language for storage in the memory 214 and execution by the processor 212 (i.e., to execute natively). This may be in addition to a second portion of the program being converted into a hardware implementation form in the FPGA 206. Thus, in one embodiment, after a program has been created, the first portion of the graphical program may be compiled for execution on the on-board processor 212 and executed locally on the smart camera 110 via the processor 212 and memory 214, and the second portion of the program may be translated or converted into a hardware executable format and uploaded to the FPGA 206 for hardware implementation. In one embodiment, one or more function modules 108 may be operable to execute a portion or all of the program to perform the function.

Thus, in various embodiments, the smart camera 110 functional unit 106 may comprise one or more processors 212, one or more programmable hardware elements 206, or any combination of the two, as desired. Additionally, the function modules 108 may include functional units 106 as required to perform their specified functions.

As shown, the smart camera 110 may include image memory 284 which couples to the programmable hardware 206, the camera 282, the processor 212, memory 214, bus interface 216, the control/data bus 218, and a local bus 217. The image memory 284 may be operable to store a portion of an image, or one or more images received from the camera 282. The image memory 284 may enable the programmable hardware 206 and/or the processor 212 to retrieve the one or more images, operate on them, and return the modified images to the image memory 284. Similarly, one or more of the function modules may be operable to retrieve the image from the image memory 284, operate on the image, and return the (possibly) modified image to the image memory 284. For example, the images may be retrievable for transmission to external systems, such as the computer system 102, via the I/O connector 220.

As shown, the smart camera 110 may further include bus interface logic 216 and a control/data bus 218. In one embodiment, the smart camera 110 and/or a function module 108 may comprise a PCI bus-compliant interface card adapted for coupling to the PCI bus of the host computer 102, or adapted for coupling to a PXI (PCI eXtensions for Instrumentation) bus. The bus interface logic 216 and the control/data bus 218 thus present a PCI or PXI interface.

As shown, in one embodiment, the smart camera 110 may also include local bus interface logic 217. In one embodiment, the local bus interface logic 217 may present a RTSI (Real Time System Integration) bus for routing timing and triggering signals between the smart camera 110 and one or more other devices or cards, such as other smart cameras 110, motion control devices 136, and/or smart sensors.

In one embodiment, the RTSI bus may provide for timing and triggering between the smart camera 110 and one or more function modules 108. In one embodiment, the RTSI bus may provide for timing and triggering between smart camera 110 and one or more devices coupled to the one or more function modules. The one or more devices may include any of one or more smart cameras 110, one or more motion control devices 136, and/or one or more smart sensors, among others.

In another embodiment, the RTSI bus may provide for timing and triggering between two or more function modules 108. In one embodiment, the RTSI bus may provide for timing and triggering between two or more devices coupled to said two or more function modules 108. Each of the two or more devices may comprise one or more of a smart camera 110, a motion control device 136, and a smart sensor, among others.

In yet another embodiment, the smart camera 110 may include data acquisition (DAQ) logic, not shown, such as analog to digital (A/D) converters, digital to analog (D/A) converters, timer counters (TC) and signal conditioning (SC) logic. Some or all of the DAQ logic may be provided by one or more of the function modules 108. The DAQ logic may be useful for signal processing and motion control applications. The programmable hardware element or FPGA 206 may access these resources directly, thereby enabling creation of very powerful measurement, DSP and control applications, among others. For example, if the camera 282 is an analog camera, the smart camera 110 may further include analog to digital (A/D) logic (not shown) for converting analog image signals into a digital image for storage in the memory 214.

Figure 5:
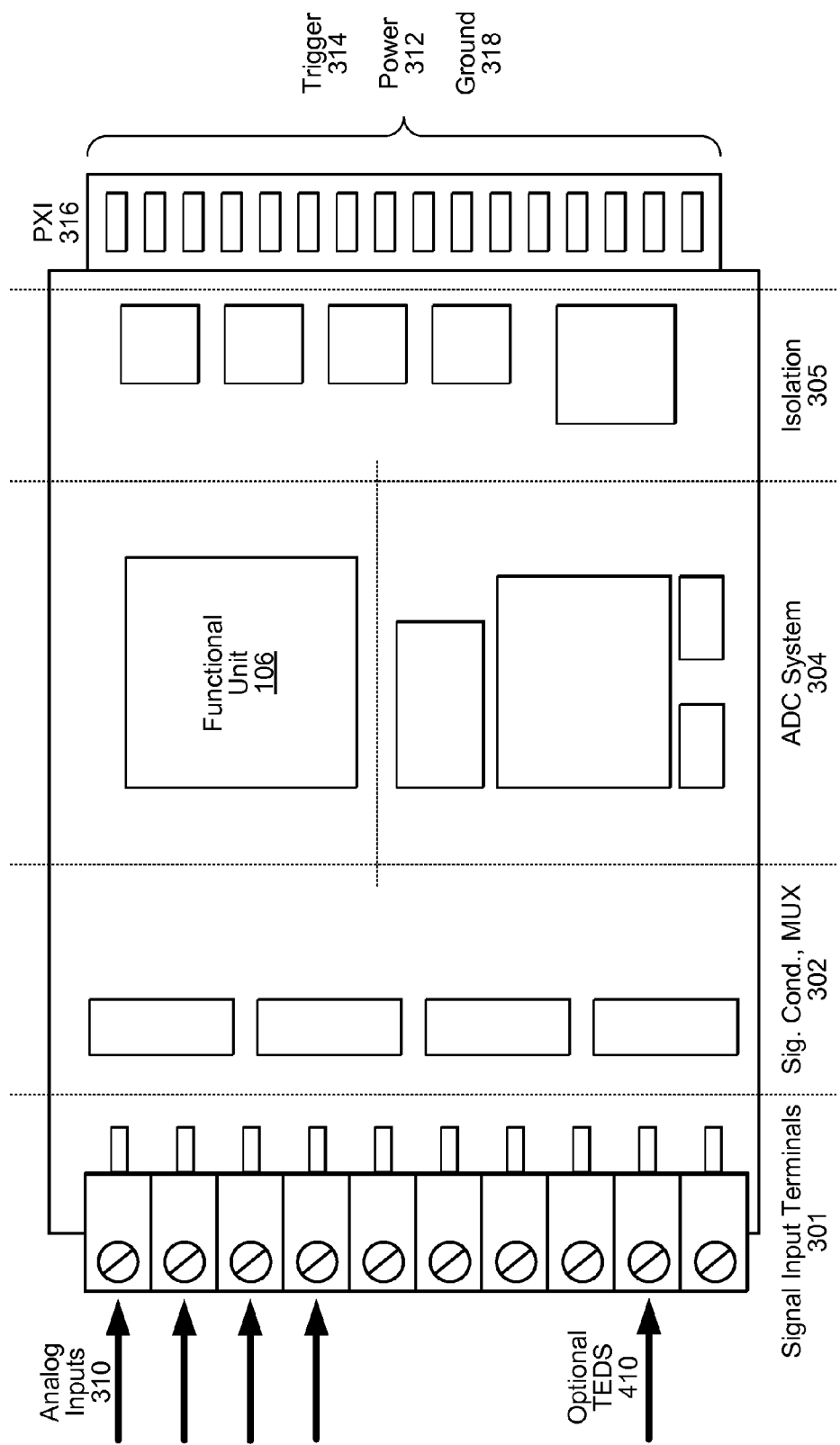
FIG. 5 is a hardware layout diagram of one embodiment of a function module.

FIG. 5—Function Module Hardware Layout

FIG. 5 illustrates one embodiment of a hardware layout of a function module 108. Note that FIG. 5 only illustrates the functional components of the functional module 108, and that in the preferred embodiment, a housing or chassis may be included for enclosure, protection, or support of the module components. It is noted that the function module 108 illustrated in FIG. 5 is meant to be exemplary only, and is not intended to limit the form or function of the function module to any particular embodiment.

As indicated in FIG. 5, in one embodiment, a printed wiring board (PWB) may include a functional unit 106, such as a processor/memory 212/214 and/or a programmable hardware element, such as an FPGA 206. As described above, in one embodiment, the functional unit 106 may operate to perform any of various image processing/analysis functions. In other embodiments, the functional unit 106 may operate to perform various other functions related to the operation of the smart camera 110, including I/O functions, communication functions, control functions, measurement functions, and GPS functions, among others.

As FIG. 5 shows, in one embodiment, the PWB may be equipped with signal input terminals 301 for receiving analog inputs 310, e.g., from a sensor. In one embodiment, a subset of the input terminals 301 may be used to receive an optional Transducer Electronic Data Sheet (TEDS) 410 describing the functionality of a transducer (e.g., sensor) in machine-readable form.

The PWB of the function module 108 may further include signal conditioning logic or circuitry 302, such as signal conditioners, multi-plexers (MUXs), etc. which may be operable to receive the signals from the analog inputs 310 and perform signal conditioning on the signals, as is well known in the art.

As FIG. 5 also shows, the PDD may also include signal conversion logic or circuitry 304, such as the ADC shown, which may be operable to receive the conditioned signals from the signal conditioning circuitry 302 and perform any of various signal conversion operations on the signals. In the embodiment shown, the ADC 304 may operate to convert the conditioned analog signals to digital signals. Of course, in other embodiments, other signal conversions may be performed as desired.

As mentioned above, in one embodiment, the functional unit 106 may provide an interface between signal conditioning/conversion components 302/304 and external systems, such as computer system 102. As also mentioned above, the functional unit 106 may be operable to communicate interface protocol information to a smart camera 110 indicating how to communicate with and operate the function module 108.

In one embodiment, isolation circuitry 305 may also be included on the PWB which may be operable to protect the components of the function module from spurious signals, signal noise, harmful voltage and/or current surges, impedance mismatches, and the like.

As FIG. 5 also shows, the PWB may also include terminals for communicating with external systems such as the computer system 102, including PXI 316, trigger line(s) 314, power 312 and ground 318 lines, among others.

As mentioned above, in various embodiments, the function module 108 may perform any of a wide variety of functions for the smart camera 110. Such functions may include, but are not limited to, measurement, image processing, communication, and control functions.

For example, in one embodiment, the function module 108 may comprise an industrial programmable logic controller including one or more of a real time controller and an embedded controller. In another embodiment, the function module 108 may comprise a motion control module for controlling servo or stepper motors. In another embodiment, the function module 108 may comprise a web server, and where the smart camera is operable to publish data to a website. In various other embodiments, the function module 108 may comprise: a Global Positioning System (GPS) module for precise positioning with a satellite system; one or more of an Ethernet carrier, a USB carrier, a FireWire carrier, and a wireless carrier; one or more digital signal processing (DSP) processors for on-board hardware signal analysis; a data acquisition (DAQ) module for direct signal analysis and conditioning; a GPIB module for connectivity to GPIB instruments; an auxiliary power source for the smart camera 110, such as a battery pack or solar generator; a display for the smart camera 110, such as an LCD display; a Graphical User Interface (GUI) for the smart camera 110; and/or a printer for the smart camera 110, among others. It is noted that in other embodiments, the function module 108 may also include mechanical components. For example, the function module 108 may include one or more gyroscopes for stabilizing the smart camera.

Thus, a smart camera 110 which includes a plurality of slots may utilize one or more function modules 108 inserted into the slots to perform a wide variety of functions, including one or more of I/O, network communications, synchronization, image processing and analysis, pattern recognition, GPS, control, measurement, signal conditioning and/or conversion, timing, triggering, display, interface, and/or any other function useful in smart camera 110 operations.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A smart camera, comprising:
   a housing having a plurality of sides;
   a camera attached to the housing for acquiring an image of an object; and
   a programmable gate array comprised in the housing and coupled to the camera, wherein the programmable gate array is configurable to implement an image processing function;
   a backplane comprised in the housing operable to provide electrical communication, wherein the backplane is coupled to the programmable gate array; and
   one or more slots comprised in the housing, wherein each of the one or more slots includes a connector that is electrically coupled to the backplane, and wherein each of the one or more slots is adapted for receiving a function module;
   a first function module adapted to be placed in one of the one or more slots and to connect to the connector for electrically coupling to the backplane, wherein, during operation, the first function module performs an industrial control/automation function based on the image of the object.

2. The smart camera of claim 1, wherein the industrial control/automation function is performed based on the image processing function.

3. The smart camera of claim 1, wherein the programmable gate array is programmable over a network.

4. The smart camera of claim 1, wherein the one or more slots comprise a plurality of slots.

5. The smart camera of claim 1, wherein the first function module is programmable over a network.

6. The smart camera of claim 1, wherein the first function module comprises a second programmable gate array.

7. The smart camera of claim 1, wherein the backplane comprises a bus for communication with one or more function modules inserted into the one or more slots, wherein the bus provides for timing and triggering between the smart camera and the one or more function modules.

8. A method for configuring a smart camera, comprising:
configuring a programmable gate array of the smart camera to implement an image processing function, wherein the smart camera comprises a backplane operable to provide electrical communication, wherein the backplane is coupled to the programmable gate array of the smart camera, and wherein the smart camera comprises one or more slots electrically coupled to the backplane for receiving one or more function modules;
inserting a first function module in one of the one or more slots, wherein the first function module provides industrial control/automation functionality for the smart camera;
acquiring an image; and
performing the industrial control/automation functionality based on the image using the first function module.

9. The method camera of claim 8, wherein the image processing function comprises pattern recognition that compares an instance of a template image to the image of the object, and wherein the industrial control/automation functionality is performed based on the pattern recognition.

10. The method of claim 8, wherein said configuring the programmable gate array is performed over a network.

11. The method of claim 8, wherein the one or more slots comprise a plurality of slots.

12. The method of claim 8, further comprising:
configuring the first function module over a network to perform the industrial control/automation functionality.

13. The method of claim 8, wherein the first function module comprises a second programmable gate array.

14. The method of claim 8, wherein the backplane comprises a bus for communication with the one or more function modules, wherein the bus provides for timing and triggering between the smart camera and the one or more function modules.

15. The smart camera of claim 1, wherein the industrial control/automation function comprises signal conditioning or signal conversion of at least one sensor signal received from a sensor coupled to the smart camera.

16. The smart camera of claim 15, wherein the first function module comprises the sensor.

17. The smart camera of claim 1, wherein the industrial control/automation function comprises vibration analysis.

18. A smart camera, comprising:
a housing having a plurality of sides;
a camera attached to the housing for acquiring an image of an object; and
a programmable gate array comprised in the housing and coupled to the camera, wherein the programmable gate array is configurable to implement an image processing function;
a backplane comprised in the housing operable to provide electrical communication, wherein the backplane is coupled to the programmable gate array; and
one or more slots comprised in the housing, wherein each of the one or more slots includes a connector that is electrically coupled to the backplane, and wherein each of the one or more slots is adapted for receiving a function module;
a first function module adapted to be placed in one of the one or more slots and to connect to the connector for electrically coupling to the backplane, wherein, during operation, the first function module performs a motion control function based on the image of the object, wherein the motion control function controls at least one actuator to perform a motion task.

19. A smart camera, comprising:
a housing having a plurality of sides;
a camera attached to the housing for acquiring an image of an object; and
a programmable gate array comprised in the housing and coupled to the camera, wherein the programmable gate array is configurable to implement an image processing function;
a backplane comprised in the housing operable to provide electrical communication, wherein the backplane is coupled to the programmable gate array; and
one or more slots comprised in the housing, wherein each of the one or more slots includes a connector that is electrically coupled to the backplane, and wherein each of the one or more slots is adapted for receiving a function module;
a first function module adapted to be placed in one of the one or more slots and to connect to the connector for electrically coupling to the backplane, wherein, during operation, the first function module comprises one or more analog inputs for receiving one or more analog signals, wherein the first function module is configured to perform vibration analysis of the one or more analog signals.

20. A smart camera, comprising:
a housing having a plurality of sides;
a camera attached to the housing for acquiring an image of an object; and
a programmable gate array comprised in the housing and coupled to the camera, wherein the programmable gate array is configurable to implement an image processing function;
a backplane comprised in the housing operable to provide electrical communication, wherein the backplane is coupled to the programmable gate array; and
one or more slots comprised in the housing, wherein each of the one or more slots includes a connector that is electrically coupled to the backplane, and wherein each of the one or more slots is adapted for receiving a function module;
a first function module adapted to be placed in one of the one or more slots and to connect to the connector for electrically coupling to the backplane, wherein, during operation, the first function module provides synchronization functionality to coordinate operation of one or more other smart cameras coupled to the smart camera, thereby implementing a distributed machine vision system.

* * * * *